US010913850B2

(12) United States Patent
Gan

(10) Patent No.: US 10,913,850 B2
(45) Date of Patent: Feb. 9, 2021

(54) POLY(PHENYLENE ETHER) COMPOSITION AND ARTICLE

(71) Applicant: SABIC GLOBAL TECHNOLOGIES B.V., Bergen Op Zoom (NL)

(72) Inventor: Haiyang Gan, Shanghai (CN)

(73) Assignee: SHPP GLOBAL TECHNOLOGIES B.V., Bergen Op Zoom (NL)

( * ) Notice: Subject to any disclaimer, the term of this patent is extended or adjusted under 35 U.S.C. 154(b) by 284 days.

(21) Appl. No.: 16/304,390

(22) PCT Filed: May 11, 2017

(86) PCT No.: PCT/IB2017/052760
§ 371 (c)(1),
(2) Date: Nov. 26, 2018

(87) PCT Pub. No.: WO2017/203381
PCT Pub. Date: Nov. 30, 2017

(65) Prior Publication Data
US 2019/0177535 A1    Jun. 13, 2019

Related U.S. Application Data

(60) Provisional application No. 62/393,716, filed on Sep. 13, 2016, provisional application No. 62/342,243, filed on May 27, 2016.

(51) Int. Cl.

| *C08L 71/12* | (2006.01) |
| *C08L 53/02* | (2006.01) |
| *B29C 45/00* | (2006.01) |
| *C08K 5/521* | (2006.01) |
| *C08K 5/5313* | (2006.01) |
| *C08L 71/02* | (2006.01) |
| *C08K 5/3492* | (2006.01) |
| *C08L 23/12* | (2006.01) |
| *C08L 23/18* | (2006.01) |
| *C08L 23/08* | (2006.01) |
| *B29K 71/00* | (2006.01) |
| *B29K 105/00* | (2006.01) |
| *B29L 31/36* | (2006.01) |

(52) U.S. Cl.
CPC ........ *C08L 71/123* (2013.01); *B29C 45/0001* (2013.01); *C08L 53/025* (2013.01); *C08L 71/12* (2013.01); *B29K 2071/12* (2013.01); *B29K 2105/0032* (2013.01); *B29K 2995/0016* (2013.01); *B29K 2995/0077* (2013.01); *B29K 2995/0082* (2013.01); *B29L 2031/36* (2013.01); *C08K 5/34928* (2013.01); *C08K 5/521* (2013.01); *C08K 5/5313* (2013.01); *C08L 23/0815* (2013.01); *C08L 23/12* (2013.01); *C08L 23/18* (2013.01); *C08L 71/02* (2013.01); *C08L 2201/02* (2013.01); *C08L 2203/20* (2013.01); *C08L 2205/025* (2013.01); *C08L 2205/035* (2013.01)

(58) Field of Classification Search
CPC .... C08L 71/12; C08L 71/123; C08L 2205/02; C08L 2205/025; C08L 2205/03; C08L 2205/035; C08L 23/0815; C08L 23/12; C08L 23/18; C08L 2203/20
See application file for complete search history.

(56) References Cited

U.S. PATENT DOCUMENTS

| 6,015,510 A | 1/2000 | Jacobson et al. |
| 6,025,419 A | 2/2000 | Kasowski et al. |
| 6,458,891 B1 | 10/2002 | Yonezawa et al. |
| 7,517,927 B2 | 4/2009 | Kosaka et al. |
| 8,003,209 B2 | 8/2011 | Flood et al. |
| 9,249,335 B2 | 2/2016 | Wiegand et al. |
| 2015/0056450 A1 | 2/2015 | Shan |
| 2015/0183991 A1* | 7/2015 | Yamamoto ............... C08K 3/04 524/126 |
| 2015/0252214 A1* | 9/2015 | Shan .................... C08K 5/5313 524/91 |
| 2018/0057685 A1* | 3/2018 | Maeda .................... C07F 9/301 |

FOREIGN PATENT DOCUMENTS

| CN | 105860412 A | * 8/2016 | |
| EP | 0274029 | 7/1988 | |
| KR | 20160149148 A | * 12/2016 | ............ C08L 71/123 |
| WO | 2005068549 | 7/2005 | |
| WO | WO-2015130118 A1 | * 9/2015 | ............. H01B 3/441 |

OTHER PUBLICATIONS

Machine translation of CN 105860412 (2016, pages).*
Machine translation of WO-2015130118 (2015, 13 pages).*
Machine translation of KR-20160149148 (2016, 11 pages).*
International Search Report for International Application No. PCT/IB2017/052760; International Filing Date: May 11, 2017; dated Sep. 6, 2017; 6 pages.
Written Opinion of the International Searching Authority for International Application No. PCT/IB2017/052760; International Filing Date: May 11, 2017; dated Sep. 6, 2017; 6 pages.

* cited by examiner

*Primary Examiner* — Brieann R Johnston
(74) *Attorney, Agent, or Firm* — Cantor Colburn LLP

(57) ABSTRACT

A composition for injection molding includes specific amounts of a poly(phenylene ether), a first hydrogenated triblock copolymer, a second hydrogenated triblock copolymer, a polypropylene, a polybutene, an ethylene/1-octene copolymer, and a flame retardant. At least one of the first and second hydrogenated triblock copolymers has a pre-hydrogenation vinyl content of 50 to 100 mole percent, based on moles of incorporated polybutadiene. Injection molded articles prepared from the composition include cable connectors and their parts.

15 Claims, 1 Drawing Sheet

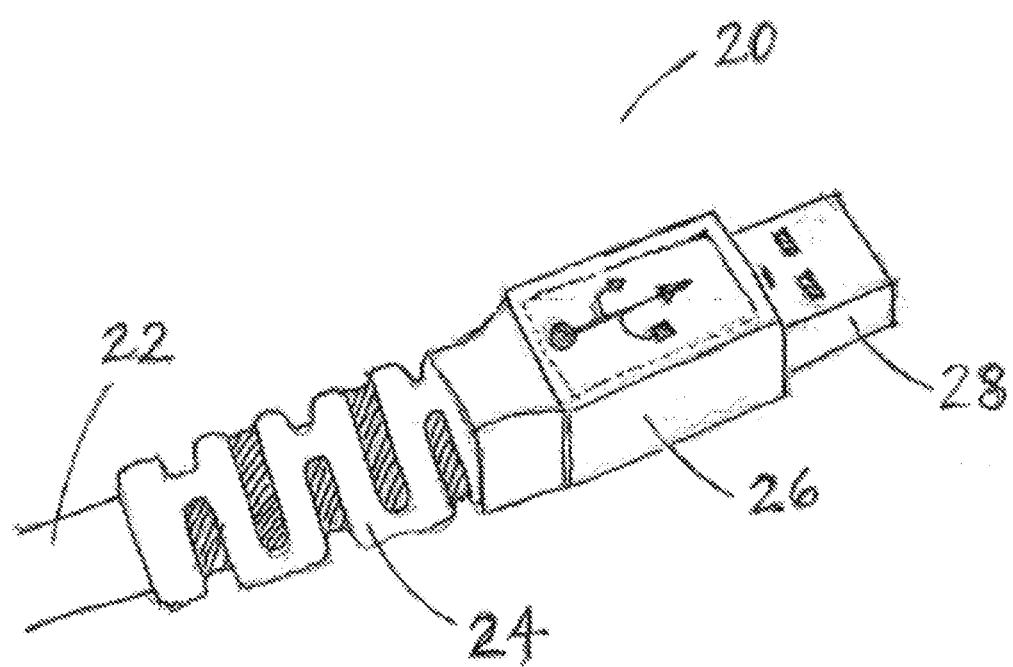

POLY(PHENYLENE ETHER) COMPOSITION AND ARTICLE

CROSS-REFERENCE TO RELATED APPLICATIONS

This application is a National Stage application of PCT/IB2017/052760, filed May 11, 2017, which claims the benefit of U.S. Provisional Application Nos. 62/342,243 filed May 27, 2016 and 62/393,716 filed Sep. 13, 2016, each of which are incorporated by reference herein in their entirety.

BACKGROUND OF THE INVENTION

Poly(phenylene ether) resin is a type of plastic valued for properties including excellent water resistance, dimensional stability, heat resistance, and inherent flame retardancy. Poly(phenylene ether) resin is typically used in blends with other plastics, including polystyrenes, polyamides (nylons), block copolymers, and polyolefins. When a blend of poly (phenylene ether), block copolymer, and polyolefin is used for injection molding, the blend must exhibit high melt flow in order to adopt the contours of the mold. An example of such an application is the injection molding of plug and strain relief (SR) portions of connectors for wire and cable. Typically, increased melt flow in blends of poly(phenylene ether), block copolymer, and polyolefin is achieved by using a low intrinsic viscosity poly(phenylene ether), a high flow block copolymer, or a high flow polyolefin, or by the addition of mineral oil or a liquid organophosphate flame retardant, or by some combination of these. However, the improvements in melt flow achieved by such formulation changes can be accompanied by reduced chemical resistance and/or molded part surfaces that are sticky to the touch. There remains a need for flame retardant blends of poly (phenylene ether), block copolymer, and polyolefin that exhibit the high melt flow needed for injection molding, while reducing or eliminating problems associated with chemical resistance and surface stickiness.

BRIEF SUMMARY OF EMBODIMENTS OF THE INVENTION

One embodiment is a composition, comprising: 15 to 30 parts by weight of a poly(phenylene ether) having an intrinsic viscosity of 0.2 to 0.6 deciliter per gram, measured at 25° C. in chloroform; 15 to 30 parts by weight of a hydrogenated triblock copolymer of styrene and butadiene, wherein the hydrogenated block copolymer comprises, based on the weight of the hydrogenated block copolymer, 30 to 50 weight percent of a first hydrogenated triblock copolymer having a polystyrene content of 30 to 50 weight percent, based on the weight of the first hydrogenated triblock copolymer, and 50 to 70 weight percent of a second hydrogenated triblock copolymer having a polystyrene content of 10 to less than 30 weight percent, based on the weight of the second hydrogenated triblock copolymer, and a melt flow rate of 10 to 40 grams per 10 minutes measured at 230° C. and 2.16 kilogram load according to ASTM D1238-13; provided that the first hydrogenated triblock copolymer, or the second hydrogenated triblock copolymer, or both the first and second hydrogenated triblock copolymers, have a pre-hydrogenation vinyl content of 50 to 100 mole percent, based on moles of incorporated polybutadiene; 30 to 50 parts by weight of polyolefin comprising 5 to 15 parts by weight of polypropylene, 4 to less than 11 parts by weight of polybutene, and 10 to 30 parts by weight of an ethylene/1-octene copolymer; and 14 to 26 parts by weight of flame retardant, comprising 0 to less than 15 parts by weight of organophosphate esters that are liquid at 23° C. and 0.1 megapascal; wherein parts by weight are based on 100 parts by weight total of poly(phenylene ether), hydrogenated block copolymer, polyolefin, and flame retardant.

Another embodiment is an injection molded article comprising the composition.

These and other embodiments are described in detail below.

BRIEF DESCRIPTION OF THE DRAWING

The FIGURE is an elevated view of a cable connector 20 with strain relief.

DETAILED DESCRIPTION OF THE INVENTION

The present inventors have determined that a specific poly(phenylene ether) composition provides improved melt flow beneficial for injection molding, without substantially increasing the stickiness of molded surfaces or substantially compromising the chemical resistance of molded articles.

One embodiment is a composition, comprising: 15 to 30 parts by weight of a poly(phenylene ether) having an intrinsic viscosity of 0.2 to 0.6 deciliter per gram, measured at 25° C. in chloroform; 15 to 30 parts by weight of a hydrogenated triblock copolymer of styrene and butadiene, wherein the hydrogenated block copolymer comprises, based on the weight of the hydrogenated block copolymer, 30 to 50 weight percent of a first hydrogenated triblock copolymer having a polystyrene content of 30 to 50 weight percent, based on the weight of the first hydrogenated triblock copolymer, and 50 to 70 weight percent of a second hydrogenated triblock copolymer having a polystyrene content of 10 to less than 30 weight percent, based on the weight of the second hydrogenated triblock copolymer, and a melt flow rate of 10 to 40 grams per 10 minutes measured at 230° C. and 2.16 kilogram load according to ASTM D1238-13; provided that the first hydrogenated triblock copolymer, or the second hydrogenated triblock copolymer, or both the first and second hydrogenated triblock copolymers, have a pre-hydrogenation vinyl content of 50 to 100 mole percent, based on moles of incorporated polybutadiene; 30 to 50 parts by weight of polyolefin comprising 5 to 15 parts by weight of polypropylene, 4 to less than 11 parts by weight of polybutene, and 10 to 30 parts by weight of an ethylene/1-octene copolymer; and 14 to 26 parts by weight of flame retardant, comprising 0 to less than 15 parts by weight of organophosphate esters that are liquid at 23° C. and 0.1 megapascal; wherein parts by weight are based on 100 parts by weight total of poly(phenylene ether), hydrogenated block copolymer, polyolefin, and flame retardant.

The composition comprises a poly(phenylene ether). Poly (phenylene ether)s include those comprising repeating structural units having the formula

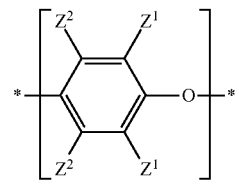

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxyl group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

In some embodiments, the poly(phenylene ether) comprises a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block.

In some embodiments, the poly(phenylene ether)-polysiloxane block copolymer is prepared by an oxidative copolymerization method. In this method, the poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-diterminated polysiloxane can comprise a plurality of repeating units having the structure

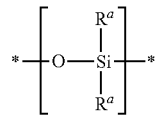

wherein each occurrence of $R^a$ is independently hydrogen, $C_1$-$C_{12}$ hydrocarbyl or $C_1$-$C_{12}$ halohydrocarbyl; and two terminal units having the structure

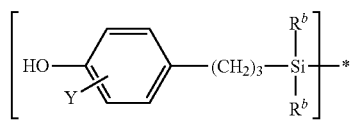

wherein Y is hydrogen, $C_1$-$C_{12}$ hydrocarbyl, $C_1$-$C_{12}$ hydrocarbyloxy, or halogen, and wherein each occurrence of $R^b$ is independently hydrogen, $C_1$-$C_{12}$ hydrocarbyl or $C_1$-$C_{12}$ halohydrocarbyl. In a very specific embodiment, each occurrence of $R^a$ and $R^b$ is methyl, and Y is methoxyl.

In some embodiments, the monohydric phenol comprises 2,6-dimethylphenol, and the hydroxyaryl-terminated polysiloxane has the structure

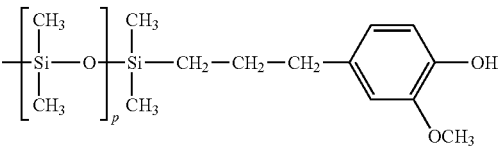

wherein p is, on average, 5 to 100, or 30 to 60.

The oxidative copolymerization method produces poly(phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. Nos. 8,017,697 and 8,669,332 to Carrillo et al. A poly(phenylene ether)-polysiloxane block copolymer having an intrinsic viscosity of 0.4 deciliter per gram is commercially available as PPO™ 843 Resin from SABIC.

In some embodiments, the poly(phenylene ether) has an intrinsic viscosity of 0.1 to 1 deciliter per gram measured by Ubbelohde viscometer at 25° C. in chloroform. Within this range, the poly(phenylene ether) intrinsic viscosity can be 0.2 to 0.6 deciliter per gram, or 0.2 to 0.5 deciliter per gram, or 0.2 to 0.4 deciliter per gram. In some embodiments, the poly(phenylene ether) is a poly(2,6-dimethyl-1,4-phenylene ether) having an intrinsic viscosity of 0.2 to 0.4 deciliter per gram. In some embodiments, the poly(phenylene ether) has an intrinsic viscosity of 0.2 to 0.4 deciliter per gram and comprises poly(phenylene ether) homopolymer and poly(phenylene ether)-polysiloxane block copolymer.

In some embodiments, the poly(phenylene ether) comprises a homopolymer or copolymer of monomers selected from the group consisting of 2,6-dimethylphenol, 2,3,6-trimethylphenol, and combinations thereof. In some embodiments, the poly(phenylene ether) comprises a poly(phenylene ether)-polysiloxane block copolymer. In these embodiments, the poly(phenylene ether)-polysiloxane block copolymer can, for example, contribute 0.05 to 2 weight percent, or 0.1 to 1 weight percent, or 0.2 to 0.8 weight percent, of siloxane groups to the composition as a whole.

Suitable poly(phenylene ether) homopolymers are commercially available as, for example, PPO™ 630, 640, and 646 Resins from SABIC Innovative Plastics. A combination of poly(phenylene ether) homopolymer and poly(phenylene ether)-polysiloxane block copolymer is commercially available as, for example, PPO™ 843 Resin from SABIC Innovative Plastics.

The composition comprises the poly(phenylene ether) in an amount of 15 to 30 parts by weight, based on 100 parts by weight total of poly(phenylene ether), hydrogenated block copolymer, polyolefin, and flame retardant. Within this range, the poly(phenylene ether) amount can be 17 to 33 parts by weight, specifically 17 to 27 parts by weight.

In addition to the poly(phenylene ether), the composition comprises a hydrogenated block copolymer of styrene and butadiene. For brevity, this component is referred to as the "hydrogenated block copolymer". The hydrogenated block copolymer comprises a first hydrogenated triblock copolymer and a second hydrogenated block copolymer. Each of these triblock copolymers comprises two polystyrene end-blocks, and one mid-block that includes hydrogenated polybutadiene. The mid-block can, optionally, further include the residue of styrene, in which case the triblock copolymer is referred to as a tapered triblock copolymer, or a controlled-distribution triblock copolymer.

The first hydrogenated triblock copolymer has a polystyrene content of 30 to 50 weight percent, based on the weight of the first hydrogenated triblock copolymer. Within this range, the polystyrene content can be 35 to 50 weight percent, or 35 to 45 weight percent. In some embodiments, the first hydrogenated triblock copolymer comprises a polystyrene-poly(ethylene-butylene-styrene)-polystyrene tapered triblock copolymer having a polystyrene content of 35 to 50 weight percent and exhibiting a melt flow rate of 4 to 16 grams per 10 minutes measured at 260° C. and 5 kilogram load according to ASTM D1238-13.

The second hydrogenated triblock copolymer has a polystyrene content of 10 to less than 30 weight percent, based on the weight of the second hydrogenated triblock copolymer, and a melt flow rate of 10 to 40 grams per 10 minutes measured at 230° C. and 2.16 kilogram load according to ASTM D1238-13. Within the range of 10 to less than 30 weight percent, the polystyrene content can be 10 to 25 weight percent, or 14 to 23 weight percent. Within the range of 10 to 40 grams per 10 minutes, the melt flow rate can be 15 to 25 grams per 10 minutes. In some embodiments, the second hydrogenated triblock copolymer comprises a polystyrene-poly(ethylene-butylene)-polystyrene triblock copolymer having a polystyrene content of 10 to 25 weight percent and exhibiting a melt flow rate of 10 to 30 grams per 10 minutes measured at 230° C. and 2.16 kilogram load according to ASTM D1238-13.

One or both of the first hydrogenated triblock copolymer and the second hydrogenated triblock copolymer have a pre-hydrogenation vinyl content of 50 to 100 mole percent, or 60 to 95 mole percent, or 65 to 90 mole percent, or 70 to 85 mole percent, or 60 to 80 mole percent, or 65 to 80 mole percent, based on moles of incorporated polybutadiene. Those skilled in the polymer arts appreciate that butadiene can polymerize via 1,2-addition, yielding a repeat unit with a pendant vinyl group,

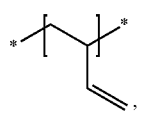

or via 1,4-addition, yielding a repeat unit having the structure

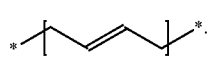

Subsequent hydrogenation of these polybutadiene residues yields repeat groups having the structures

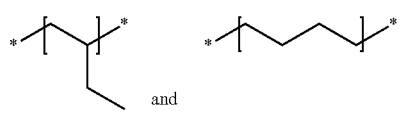

and respectively. So, by determining (e.g., by proton nuclear magnetic resonance spectroscopy, $^1$H NMR) the mole percent of each of the last two repeat unit types in the hydrogenated block copolymer, one can calculate the pre-hydrogenation vinyl content of the hydrogenated block copolymer, expressed in mole percent based on moles of incorporated polybutadiene. Specifically, PHVC=100×(moles 1,2-butylene)/(moles 1,2-butylene+moles 1,4-butylene)

where "PHVC" is the pre-hydrogenation vinyl content of the hydrogenated block copolymer; "moles 1,2-butylene" is moles of repeat units having the structure

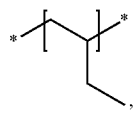

and "moles 1,4-butylene" is moles of repeat units having the structure

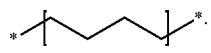

In some embodiments, the first hydrogenated triblock copolymer has a pre-hydrogenation vinyl content of 50 to 100 mole percent, or 60 to 95 mole percent, or 65 to 90 mole percent, or 70 to 85 mole percent, or 60 to 80 mole percent, or 65 to 80 mole percent, based on moles of incorporated polybutadiene, and the second hydrogenated triblock copolymer has a pre-hydrogenation vinyl content less than 50 mole percent, based on moles of incorporated polybutadiene. In other embodiments, the second hydrogenated triblock copolymer has a pre-hydrogenation vinyl content of 50 to 100 mole percent, or 60 to 95 mole percent, or 65 to 90 mole percent, or 70 to 85 mole percent, or 60 to 80 mole percent, or 65 to 80 mole percent, based on moles of incorporated polybutadiene, and the first hydrogenated triblock copolymer has a pre-hydrogenation vinyl content less than 50 mole percent, based on moles of incorporated polybutadiene. In other embodiments, each of the first and second hydrogenated triblock copolymers independently has a pre-hydrogenation vinyl content of 50 to 100 mole percent, or 60 to 95 mole percent, or 65 to 90 mole percent, or 70 to 85 mole percent, or 60 to 80 mole percent, or 65 to 80 mole percent, based on moles of incorporated polybutadiene.

Method of synthesizing hydrogenated block copolymers while controlling polystyrene content, melt flow rate, and pre-hydrogenation vinyl content are known in the art and include, for example, U.S. Pat. No. 7,439,301 to Handlin, Jr., U.S. Pat. No. 8,003,209 to Flood et al., and U.S. Pat. No. 9,249,335 B2 to Wiegand et al. Commercially available examples of first hydrogenated triblock copolymers include, for example, KRATON™ A1536 and KRATON™ G1641, from Kraton Performance Polymers. Commercially available examples of second hydrogenated triblock copolymers include, for example, KRATON™ G1643 and KRATON™ G1657, from Kraton Performance Polymers.

The composition comprises the hydrogenated block copolymer in an amount of 15 to 30 parts by weight, based on 100 parts by weight total of poly(phenylene ether), hydrogenated block copolymer, polyolefin, and flame retardant. Within this range, the hydrogenated block copolymer amount can be 16 to 26 parts by weight.

The hydrogenated block copolymer comprises, based on the weight of the hydrogenated block copolymer, 30 to 50 weight percent of the first hydrogenated triblock copolymer. Within the range of 30 to 50 weight percent, the first hydrogenated triblock copolymer amount can be 30 to 45 weight percent.

The hydrogenated block copolymer further comprises, based on the weight of the hydrogenated block copolymer, 50 to 70 weight percent of the second hydrogenated triblock copolymer. Within the range of 50 to 70 weight percent, the second hydrogenated triblock copolymer amount can be 55 to 70 weight percent.

The hydrogenated block copolymer can consist of the first hydrogenated triblock copolymer and the second hydrogenated triblock copolymer. Alternatively, the hydrogenated block copolymer can comprise up to 20 weight percent of one or more hydrogenated block copolymers other than the first hydrogenated triblock copolymer and the second hydrogenated triblock copolymer. For example, it may be useful to include up to 20 weight percent, based on the weight of hydrogenated block copolymer, of a polystyrene-poly(ethylene-butylene)-polystyrene triblock copolymer with a polystyrene content of 20 to 35 weight percent, a melt flow of greater than 40 grams/10 minutes to 100 grams/10 minutes measured at 230° C. and 2.16 kilograms, and a pre-hydrogenation vinyl content of 50 to 100 mole percent.

In addition to the poly(phenylene ether) and the hydrogenated block copolymer, the composition comprises a polyolefin. Polyolefins include polyethylenes (including high density polyethylene (HDPE), low density polyethylene (LDPE), medium density polyethylene (MDPE), and linear low density polyethylene (LLDPE)), polypropylenes (including atactic, syndiotactic, and isotactic polypropylenes), and polybutenes (including polyisobutylenes). Polyolefins further include ethylene/alpha-olefin copolymers, such as copolymers of ethylene and propylene, copolymers of ethylene and 1-butene, copolymers of ethylene and 1-hexene, and copolymers of ethylene and 1-octene. Additionally, copolymers of olefins can also be used, such as copolymers of polypropylene with rubber and polyethylene with rubber. Copolymers of polypropylene and rubber are sometimes referred to as impact modified polypropylene. Such copolymers are typically heterophasic and have sufficiently long sections of each component to have both amorphous and crystalline phases. Additionally the polyolefin can comprise a combination of homopolymer and copolymer, a combination of homopolymers having different melt temperatures, and/or a combination of homopolymers having a different melt flow rate. In some embodiments, the polyolefin comprises a high density polyethylene (HDPE). The high density polyethylene can have a density of 0.941 to 0.965 grams per milliliter. In some embodiments, the polyolefin has a melt flow rate (MFR) of 0.3 to 10 grams per ten minutes (g/10 min). Specifically, the melt flow rate can be 0.3 to 5 grams per ten minutes. Melt flow rate can be determined according to ASTM D1238-10 using either powdered or pelletized polyolefin, a load of 2.16 kilograms and a temperature suitable for the polyolefin (190° C. for ethylene-based polyolefins and 230° C. for propylene-based polyolefins).

In some embodiments, the polyolefin comprises polypropylene, polybutene, and an ethylene/1-octene copolymer.

As used herein, the term "polypropylene" refers to a propylene homopolymer. The polypropylene can be atactic, syndiotactic, isotactic, or a combination thereof. In some embodiments, the polypropylene is an atactic polypropylene having a melt flow rate of 4 to 16 grams per 10 minutes, or 5 to 12 grams per 10 minutes, measured at 230° C. and 2.16 kilogram load according to ASTM D1238-13. Polypropylene is commercially available as, for example, PP 570P Resin from SABIC.

As used herein, the term "polybutene" refers to a polymer comprising at least 75 weight percent of units, or at least 80 weight percent of units, derived from 1-butene, 2-butene, 2-methylpropene (isobutene), or a combination thereof. The polybutene can be a homopolymer or a copolymer. In some embodiments, the polybutene consists of units derived from 1-butene, 2-butene, 2-methylpropene (isobutene), or a combination thereof. In other embodiments, the polybutene is a copolymer that comprises 1 to 25 weight percent of repeat units derived from a copolymerizable monomer such as ethylene, propylene, or 1-octene. In some embodiments, the polybutene is a homopolymer of 2-methylpropene. In other embodiments, the polybutene is a copolymer of 2-methylpropene with 1-butene and/or 2-butene. In still other embodiments, the polybutene is a combination of a homopolymer of 2-methylpropene, and a copolymer of 2-methylpropene with 1-butene and/or 2-butene. The polybutene can, optionally, have a number average molecular weight of 500 to 1500 grams/mole. Number average molecular weight can be determined by gel permeation chromatography using polystyrene standards. Within the range of 500 to 1500 grams/mole, the number average molecular weight can be 600 to 1400 grams/mole, or 600 to 1200 grams/mole. Polybutene is commercially available as, for example, INDOPOL™ H-50 from INEOS.

As used herein, the term "ethylene/1-octene copolymer" refers to a copolymer in which at least 90 mole percent of repeat units are derived from ethylene and 1-octene. Additional repeat units, when present, can be derived from maleic anhydride. Suitable ethylene/1-octene copolymers include those having melt flow rates of 0.5 to 20 grams per 10 minutes, measured at 190° C. and 2.16 kilogram load. Ethylene/1-octene copolymer is commercially available as, for example, QUEO™ 8201 and 8210 from Borealis, and FUSABOND™ N493 from DuPont.

The composition comprises 30 to 50 parts by weight of polyolefin, based on 100 parts by weight total of poly (phenylene ether), hydrogenated block copolymer, polyolefin, and flame retardant. Within this range, the polyolefin amount can be 32 to 48 parts by weight.

In embodiments in which the polyolefin comprises polypropylene, polybutene, and an ethylene/1-octene copolymer, those components are present in amounts, based on 100 parts by weight total of poly(phenylene ether), hydrogenated block copolymer, polyolefin, and flame retardant, of 5 to 15 parts by weight, or 6 to 13 parts by weight, of polypropylene, 4 to less than 11 parts by weight, or 4 to 10 parts by weight, or 5 to 10 parts by weight, of the polybutene, and 10 to 30 parts by weight, or 15 to 25 parts by weight, of the ethylene/1-octene copolymer.

In addition to the poly(phenylene ether), the hydrogenated block copolymer, and the polyolefin, the composition comprises a flame retardant. A flame retardant is a chemical compound or mixture of chemical compounds capable of improving the flame retardancy of the composition. Suitable flame retardants include organophosphate esters, metal dialkylphosphinates, bis(phenoxy)phosphazenes, melamine-based flame retardants, metal hydroxides, and combinations thereof.

In some embodiments, the flame retardant comprises an organophosphate ester. Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis (diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), t-butylphenyl diphenyl phosphates (CAS Reg. No. 56803-37-3), bis(t-butylphenyl) phenyl phosphates (CAS Reg. No. 65652-41-7), tris(t-butylphenyl) phosphates (CAS Reg. No. 78-33-1), and combinations thereof.

In some embodiments the organophosphate ester comprises a bis-aryl phosphate having the formula

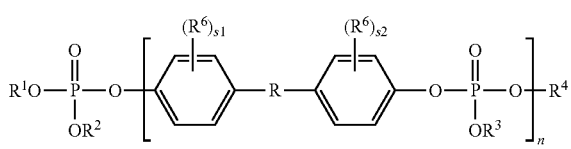

wherein R is independently at each occurrence a $C_1$-$C_{12}$ alkylene group; $R^5$ and $R^6$ are independently at each occurrence a $C_1$-$C_5$ alkyl group; $R^1$, $R^2$, and $R^4$ are independently a $C_1$-$C_{12}$ hydrocarbyl group; $R^3$ is independently at each occurrence a $C_1$-$C_{12}$ hydrocarbyl group; n is 1 to 25; and s1 and s2 are independently an integer equal to 0, 1, or 2. In some embodiments $OR^1$, $OR^2$, $OR^3$ and $OR^4$ are independently derived from phenol, a monoalkylphenol, a dialkylphenol, or a trialkylphenol. As readily appreciated by one of ordinary skill in the art, the bis-aryl phosphate is derived from a bisphenol. Exemplary bisphenols include 2,2-bis(4-hydroxyphenyl)propane (bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In some embodiments, the bisphenol comprises bisphenol A. In some embodiments, the composition comprises 0 to less than 15 parts by weight, or 0 to less than 12 parts by weight, of organophosphate esters that are liquid at 23° C. and 0.1 megapascal.

In some embodiments, the flame retardant comprises a metal dialkylphosphinate. As used herein, the term "metal dialkylphosphinate" refers to a salt comprising at least one metal cation and at least one dialkylphosphinate anion. In some embodiments, the metal dialkylphosphinate has the formula

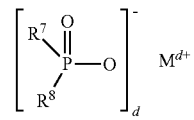

wherein $R^7$ and $R^8$ are each independently $C_1$-$C_6$ alkyl; M is calcium, magnesium, aluminum, or zinc; and d is 2 or 3. Examples of $R^7$ and $R^8$ include methyl, ethyl, n-propyl, isopropyl, n-butyl, tert-butyl, and n-pentyl. In some embodiments, $R^7$ and $R^8$ are ethyl, M is aluminum, and d is 3 (that is, the metal dialkylphosphinate is aluminum tris(diethylphosphinate)).

In some embodiments, the metal dialkylphosphinate is in particulate form. The metal dialkylphosphinate particles may have a median particle diameter (D50) less than or equal to 40 micrometers, or, more specifically, a D50 less than or equal to 30 micrometers, or, even more specifically, a D50 less than or equal to 25 micrometers. Additionally, the metal dialkylphosphinate may be combined with a polymer, such as a poly(phenylene ether), a polyolefin, a polyamide, a block copolymer, or combination thereof, to form a masterbatch. The metal dialkylphosphinate masterbatch comprises the metal dialkylphosphinate in an amount greater than is present in the thermoplastic composition. Employing a masterbatch for the addition of the metal dialkylphosphinate to the other components of the composition can facilitate addition and improve distribution of the metal dialkylphosphinate.

In some embodiments, the flame retardant comprises a bis(phenoxy)phosphazene. The bis(phenoxy)phosphazene can be oligomeric or polymeric, and it can be cyclic or linear. In some embodiments, the bis(phenoxy)phosphazene is cyclic and has the structure

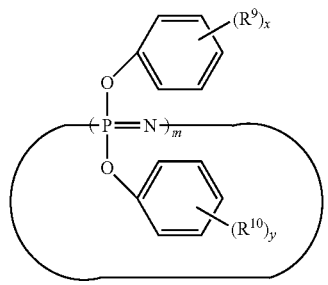

wherein m is an integer of 3 to 25; x and y are each independently 0, 1, 2, 3, 4, or 5; and each occurrence of $R^9$ and $R^{10}$ is halogen, $C_1$-$C_{12}$ alkyl, or $C_1$-$C_{12}$ alkoxyl.

In other embodiments, the bis(phenoxy)phosphazene is linear and has the structure

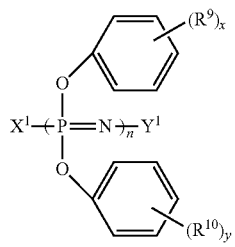

wherein n is an integer from 3 to 10,000; $X^1$ represents a —N=P(OPh)$_3$ group or a —N=P(O)(OPh) group wherein Ph represents a phenyl group; $Y^1$ represents a —P(OPh)$_4$ group or a —P(O)(OPh)$_2$ group; x and y are each independently 0, 1, 2, 3, 4, or 5; and each occurrence of $R^9$ and $R^{10}$ is halogen, $C_1$-$C_{12}$ alkyl, or $C_1$-$C_{12}$ alkoxyl.

In some embodiments, the flame retardant comprises a melamine-based flame retardant. Melamine-based flame retardants include a melamine base and a phosphate or pyrophosphate or polyphosphate or cyanurate acid. In some embodiments, the melamine-based flame retardant has the formula

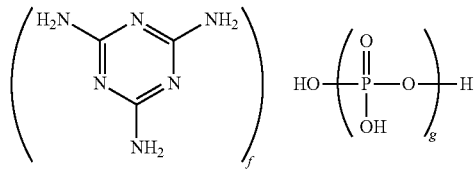

wherein g is 1 to 10,000, and the ratio of f to g is 0.5:1 to 1.7:1, specifically 0.7:1 to 1.3:1, more specifically 0.9:1 to 1.1:1. It will be understood that this formula includes species in which one or more protons are transferred from the phosphate group(s) to the melamine group(s). When g is 1, the melamine-based flame retardant is melamine phosphate (CAS Reg. No. 20208-95-1). When g is 2, the melamine-based flame retardant is melamine pyrophosphate (CAS Reg. No. 15541 60-3). When g is, on average, greater than 2, the melamine-based flame retardant is a melamine polyphosphate (CAS Reg. No. 56386-64-2). In some embodiments, the melamine-based flame retardant is melamine pyrophosphate, melamine polyphosphate, or a mixture thereof. In some embodiments in which the melamine-based flame retardant is melamine polyphosphate, g has an average value of greater than 2 to 10,000, or 5 to 1,000, or 10 to 500. In some embodiments in which the melamine-based flame retardant is melamine polyphosphate, g has an average value of greater than 2 to 500. Methods for preparing melamine phosphate, melamine pyrophosphate, and melamine polyphosphate are known in the art, and all are commercially available. For example, melamine polyphosphates may be prepared by reacting polyphosphoric acid and melamine, as described, for example, in U.S. Pat. No. 6,025,419 to Kasowski et al., or by heating melamine pyrophosphate under nitrogen at 290° C. to constant weight, as described in U.S. Pat. No. 6,015,510 to Jacobson et al. In some embodiments, the melamine-based flame retardant comprises melamine cyanurate.

In some embodiments, the flame retardant comprises a metal hydroxide. Suitable metal hydroxides include all those capable of providing fire retardancy, as well as combinations of such metal hydroxides. The metal hydroxide can be chosen to have substantially no decomposition during processing of the fire additive composition and/or flame retardant thermoplastic composition. Substantially no decomposition is defined herein as amounts of decomposition that do not prevent the flame retardant additive composition from providing the desired level of fire retardancy. Exemplary metal hydroxides include, but are not limited to, magnesium hydroxide (for example, CAS Reg. No. 1309-42-8), aluminum hydroxide (for example, CAS Reg. No. 21645-51-2), cobalt hydroxide (for example, CAS Reg. No. 21041-93-0), and combinations thereof. In some embodiments, the metal hydroxide comprises magnesium hydroxide. In some embodiments the metal hydroxide has an average particle size less than or equal to 10 micrometers and/or a purity greater than or equal to 90 weight percent. In some embodiments it is desirable for the metal hydroxide to contain substantially no water, for example as evidenced by a weight loss of less than 1 weight percent upon drying at 120° C. for 1 hour. In some embodiments the metal hydroxide can be coated, for example, with stearic acid or other fatty acid.

The composition comprises 14 to 26 parts by weight of the flame retardant, provided that the flame retardant comprises 0 to less than 15 parts by weight, or 0 to less than 12 parts by weight, of organophosphate esters that are liquid at 23° C. and 0.1 megapascal. Within the range of 14 to 26 parts by weight, the flame retardant amount can be 15 to 25 parts by weight. All parts by weight are based on 100 parts by weight total of poly(phenylene ether), hydrogenated block copolymer, polyolefin, and flame retardant.

In some embodiments, the flame retardant comprises a metal dialkylphosphinate, a melamine polyphosphate, and an organophosphate ester. In some embodiments, the flame retardant comprises 1 to 6 parts by weight, or 2 to 5 parts by weight, of metal dialkylphosphinate, 2 to 8 parts by weight, or 3 to 7 parts by weight, of melamine polyphosphate, and 4 to 17 parts by weight, or 5 to 15 parts by weight, of organophosphate ester.

The composition can, optionally, further comprise a poly (alkylene oxide). As used herein, the term "poly(alkylene oxide)" includes homopolymers of $C_2$-$C_4$ alkylene oxides (such as poly(ethylene oxide)s, poly(propylene oxide)s, poly (butylene oxide)s, and homopolymers of $C_2$-$C_4$ alkylene oxides initiated in the presence of a non-corresponding alcohol, such as pentaerythritol), random copolymers of $C_2$-$C_4$ alkylene oxides (such as random copolymers of ethylene oxide and propylene oxide), block copolymers of $C_2$-$C_4$ alkylene oxides (such as diblock and triblock copolymers of ethylene oxide and propylene oxide), mono($C_1$-$C_{12}$)ethers and di($C_1$-$C_{12}$)ethers of the foregoing (such as poly(ethylene oxide) dibutyl ether and poly(propylene oxide) monobutyl ether), mono($C_2$-$C_{12}$)esters and di($C_2$-$C_{12}$)esters of the foregoing (such as poly(ethylene oxide) diacetyl ester and poly(propylene oxide) monopropionyl ester), and combinations thereof. In some embodiments, the poly(alkylene oxide) excludes ester linkages.

In some embodiments, the poly(alkylene oxide) is selected from the group consisting of poly(ethylene oxide)s, poly(propylene oxide)s, random copolymers of ethylene oxide and propylene oxide, block copolymers of ethylene oxide and propylene oxide, monoalkyl ethers of the foregoing, dialkyl ethers of the foregoing, and combinations thereof. In a very specific embodiment, the poly(alkylene oxide) comprises a poly(propylene oxide) mono($C_1$-$C_{12}$-alkyl) ether.

In some embodiments, the poly(alkylene oxide) has a number average molecular weight of 300 to 40,000 grams/mole. Within this range, the number average molecular weight can be 300 to 25,000 grams/mole, specifically 500 to 5,000 grams/mole.

When present, the poly(alkylene oxide) can be used in an amount of 0.5 to 10 parts by weight, or 1 to 5 parts by weight, based on 100 parts by weight total of poly(phenylene ether), hydrogenated block copolymer, polyolefin, and flame retardant.

The composition can, optionally, further comprise one or more additives known in the thermoplastics art. For example, the composition can, optionally, further comprise an additive selected from the group consisting of stabilizers, mold release agents, lubricants, processing aids, drip retardants, hindered amine light stabilizers, cycloaliphatic epoxy resins, dyes, pigments, antioxidants, anti-static agents, mineral oil, metal deactivators, and combinations thereof. When present, such additives are typically used in a total amount of less than or equal to 15 parts by weight, or less than or equal to 12 parts by weight, based on 100 parts by weight total of poly(phenylene ether), hydrogenated block copolymer, polyolefin, and flame retardant. Excluding white pigment, such additives are typically used in a total amount of less than or equal to 5 parts by weight, or less than or equal to 4 parts by weight, or less than or equal to 3 parts by weight, based on 100 parts by weight total of poly(phenylene ether), hydrogenated block copolymer, polyolefin, and flame retardant.

The composition can, optionally, minimize or exclude polymers other than those described herein as required or optional. For example, in some embodiments the composition comprises 0 to 2 parts by weight, or 0 to 1 part by weight, or 0 part by weight, of homopolystyrenes, based on 100 parts by weight total of poly(phenylene ether), hydrogenated block copolymer, polyolefin, and flame retardant. As another example, in some embodiments the composition comprises 0 to 2 parts by weight, or 0 to 1 part by weight, or 0 part by weight, of rubber-modified polystyrenes (also known as high impact polystyrenes or HIPS), based on 100 parts by weight total of poly(phenylene ether), hydrogenated block copolymer, polyolefin, and flame retardant. As another example, in some embodiments the composition comprises 0 to 2 parts by weight, or 0 to 1 part by weight, or 0 part by weight, of polyamides, based on 100 parts by weight total of poly(phenylene ether), hydrogenated block copolymer, polyolefin, and flame retardant.

In a very specific embodiment of the composition, the poly(phenylene ether) comprises a poly(2,6-dimethyl-1,4-phenylene ether) having an intrinsic viscosity of 0.2 to 0.4 deciliter per gram; the first hydrogenated triblock copolymer comprises a polystyrene-poly(ethylene-butylene-styrene)-polystyrene tapered triblock copolymer exhibiting a melt flow rate of 4 to 16 grams per 10 minutes measured at 260° C. and 5 kilogram load according to ASTM D1238-13; the second hydrogenated triblock copolymer comprises a polystyrene-poly(ethylene-butylene)-polystyrene triblock copolymer exhibiting a melt flow rate of 10 to 30 grams per 10 minutes measured at 230° C. and 2.16 kilogram load according to ASTM D1238-13; the flame retardant comprises metal dialkylphosphinate, melamine polyphosphate, and organophosphate ester; and the composition comprises 17 to 27 parts by weight of the poly(phenylene ether), 16 to 26 parts by weight of the hydrogenated block copolymer, comprising 30 to 45 weight percent of the first hydrogenated triblock copolymer, and 55 to 70 weight percent of the second hydrogenated triblock copolymer; 32 to 48 parts by weight of the polyolefin comprising 6 to 13 parts by weight of polypropylene, 4 to 10 parts by weight of polybutene, and 15 to 25 parts by weight of an ethylene/1-octene copolymer; and 15 to 25 parts by weight of the flame retardant, comprising 1 to 6 parts by weight of metal dialkylphosphinate, 2 to 8 parts by weight of melamine polyphosphate, and 4 to 17 parts by weight of organophosphate ester.

The composition can be prepared by melt-blending or melt-kneading the components of the composition. The melt-blending or melt-kneading can be performed using common equipment such as ribbon blenders, HENSCHEL™ mixers, BANBURY™ mixers, drum tumblers, single-screw extruders, twin-screw extruders, multi-screw extruders, and co-kneaders. For example, the composition can be prepared by melt-blending the components in a twin-screw extruder at a temperature of 230 to 260° C., specifically 235 to 255° C.

One embodiment is an injection molded article, comprising a composition comprising: 15 to 30 parts by weight of a poly(phenylene ether) having an intrinsic viscosity of 0.2 to 0.6 deciliter per gram, measured at 25° C. in chloroform; 15 to 30 parts by weight of a hydrogenated triblock copolymer of styrene and butadiene, wherein the hydrogenated block copolymer comprises, based on the weight of the hydrogenated block copolymer, 30 to 50 weight percent of a first hydrogenated triblock copolymer having a polystyrene content of 30 to 50 weight percent, based on the weight of the first hydrogenated triblock copolymer, and 50 to 70 weight percent of a second hydrogenated triblock copolymer having a polystyrene content of 10 to less than 30 weight percent, based on the weight of the second hydrogenated triblock copolymer, and a melt flow rate of 10 to 40 grams per 10 minutes measured at 230° C. and 2.16 kilogram load according to ASTM D1238-13; provided that the first hydrogenated triblock copolymer, or the second hydrogenated triblock copolymer, or both the first and second hydrogenated triblock copolymers, have a pre-hydrogenation vinyl content of 50 to 100 mole percent, based on moles of incorporated polybutadiene; 30 to 50 parts by weight of polyolefin comprising 5 to 15 parts by weight of polypropylene, 4 to less than 11 parts by weight of polybutene, and 10 to 30 parts by weight of an ethylene/1-octene copolymer; and 14 to 26 parts by weight of flame retardant, comprising 0 to less than 15 parts by weight of organophosphate esters that are liquid at 23° C. and 0.1 megapascal; wherein parts by weight are based on 100 parts by weight total of poly(phenylene ether), hydrogenated block copolymer, polyolefin, and flame retardant.

The injection molded article can be, for example, a cable connector or a part of a cable connector.

The FIGURE depicts a USB connector-terminated cable 20 comprising cable 22, strain relief 24, connector exterior 26, and connector interior 28. The strain relief 24 and connector exterior 26 are formed by injection molding the composition over the cable 22 and connector interior 28.

Conditions for injection molding the composition can be determined by the skilled person and can include, for example, a melt temperature of 230 to 260° C., and a mold temperature of 20 to 100° C.

In a specific embodiment of the injection molded article, the poly(phenylene ether) comprises a poly(2,6-dimethyl-1,4-phenylene ether) having an intrinsic viscosity of 0.2 to 0.4 deciliter per gram; the first hydrogenated triblock copolymer comprises a polystyrene-poly(ethylene-butylene-styrene)-polystyrene tapered triblock copolymer exhibiting a melt flow rate of 4 to 16 grams per 10 minutes measured at 260° C. and 5 kilogram load according to ASTM D1238-13; the second hydrogenated triblock copolymer comprises a polystyrene-poly(ethylene-butylene)-polystyrene triblock copolymer exhibiting a melt flow rate of 10 to 30 grams per 10 minutes measured at 230° C. and 2.16 kilogram load according to ASTM D1238-13; the flame retardant comprises metal dialkylphosphinate, melamine polyphosphate, and organophosphate ester; and the composition comprises 17 to 27 parts by weight of the poly(phenylene ether), 16 to 26 parts by weight of the hydrogenated block copolymer, comprising 30 to 45 weight percent of the first hydrogenated triblock copolymer, and 55 to 70 weight percent of the second hydrogenated triblock copolymer; 32 to 48 parts by weight of the polyolefin comprising 6 to 13 parts by weight of polypropylene, 4 to 10 parts by weight of polybutene, and 15 to 25 parts by weight of an ethylene/1-octene copolymer; and 15 to 25 parts by weight of the flame retardant, comprising 1 to 6 parts by weight of metal dialkylphosphinate, 2 to 8 parts by weight of melamine polyphosphate, and 4 to 17 parts by weight of organophosphate ester.

The invention includes at least the following embodiments.

Embodiment 1

A composition, comprising: 15 to 30 parts by weight of a poly(phenylene ether) having an intrinsic viscosity of 0.2 to 0.6 deciliter per gram, measured at 25° C. in chloroform; 15 to 30 parts by weight of a hydrogenated triblock copolymer of styrene and butadiene, wherein the hydrogenated block copolymer comprises, based on the weight of the hydrogenated block copolymer, 30 to 50 weight percent of a first hydrogenated triblock copolymer having a polystyrene content of 30 to 50 weight percent, based on the weight of the first hydrogenated triblock copolymer, and 50 to 70 weight percent of a second hydrogenated triblock copolymer having a polystyrene content of 10 to less than 30 weight percent, based on the weight of the second hydrogenated triblock copolymer, and a melt flow rate of 10 to 40 grams per 10 minutes measured at 230° C. and 2.16 kilogram load according to ASTM D1238-13; provided that the first hydrogenated triblock copolymer, or the second hydrogenated triblock copolymer, or both the first and second hydrogenated triblock copolymers, have a pre-hydrogenation vinyl content of 50 to 100 mole percent, based on moles of incorporated polybutadiene; 30 to 50 parts by weight of polyolefin comprising 5 to 15 parts by weight of polypropylene, 4 to less than 11 parts by weight of polybutene, and 10 to 30 parts by weight of an ethylene/1-octene copolymer; and 14 to 26 parts by weight of flame retardant, comprising 0 to less than 15 parts by weight of organophosphate esters that are liquid at 23° C. and 0.1 megapascal; wherein parts by weight are based on 100 parts by weight total of poly(phenylene ether), hydrogenated block copolymer, polyolefin, and flame retardant.

Embodiment 2

The composition of embodiment 1, wherein the first hydrogenated triblock copolymer comprises a polystyrene-poly(ethylene-butylene-styrene)-polystyrene tapered triblock copolymer having a polystyrene content of 35 to 50 weight percent and exhibiting a melt flow rate of 4 to 16 grams per 10 minutes measured at 260° C. and 5 kilogram load according to ASTM D1238-13.

Embodiment 3

The composition of embodiment 1 or 2, wherein the second hydrogenated triblock copolymer comprises a polystyrene-poly(ethylene-butylene)-polystyrene triblock copolymer having a polystyrene content of 10 to 25 weight percent and exhibiting a melt flow rate of 10 to 30 grams per 10 minutes measured at 230° C. and 2.16 kilogram load according to ASTM D1238-13.

Embodiment 4

The composition of any one of embodiments 1-3, wherein the flame retardant comprises metal dialkylphosphinate, melamine polyphosphate, and organophosphate ester.

Embodiment 5

The composition of any one of embodiments 1-3, wherein the flame retardant comprises 1 to 6 parts by weight of metal dialkylphosphinate, 2 to 8 parts by weight of melamine polyphosphate, and 4 to 17 parts by weight of organophosphate ester.

Embodiment 6

The composition of any one of embodiments 1-5, further comprising 0.5 to 10 parts by weight of a poly(alkylene oxide).

Embodiment 7

The composition of embodiment 6, wherein the poly(alkylene oxide) is selected from the group consisting of poly(ethylene oxide)s, poly(propylene oxide)s, random copolymers of ethylene oxide and propylene oxide, block copolymers of ethylene oxide and propylene oxide, monoalkyl ethers of the foregoing, dialkyl ethers of the foregoing, and combinations thereof.

Embodiment 8

The composition of any one of embodiments 1-7, wherein the first hydrogenated triblock copolymer, or the second hydrogenated triblock copolymer, or both the first and second hydrogenated triblock copolymers, have a pre-hydrogenation vinyl content of 60 to 80 mole percent, based on moles of incorporated polybutadiene.

Embodiment 9

The composition of embodiment 1, wherein the poly(phenylene ether) comprises a poly(2,6-dimethyl-1,4-phenylene ether) having an intrinsic viscosity of 0.2 to 0.4 deciliter per gram; wherein the first hydrogenated triblock copolymer comprises a polystyrene-poly(ethylene-butylene-styrene)-polystyrene tapered triblock copolymer exhibiting a melt flow rate of 4 to 16 grams per 10 minutes measured at 260° C. and 5 kilogram load according to ASTM D1238-13; wherein the second hydrogenated triblock copolymer comprises a polystyrene-poly(ethylene-butylene)-polystyrene triblock copolymer exhibiting a melt flow rate of 10 to 30 grams per 10 minutes measured at 230° C. and 2.16 kilogram load according to ASTM D1238-13; wherein the flame retardant comprises metal dialkylphosphinate, melamine polyphosphate, and organophosphate ester; and wherein the composition comprises 17 to 27 parts by weight of the poly(phenylene ether), 16 to 26 parts by weight of the hydrogenated block copolymer, comprising 30 to 45 weight percent of the first hydrogenated triblock copolymer, and 55 to 70 weight percent of the second hydrogenated triblock copolymer; 32 to 48 parts by weight of the polyolefin comprising 6 to 13 parts by weight of polypropylene, 4 to 10 parts by weight of polybutene, and 15 to 25 parts by weight of an ethylene/1-octene copolymer; and 15 to 25 parts by weight of the flame retardant, comprising 1 to 6 parts by weight of metal dialkylphosphinate, 2 to 8 parts by weight of melamine polyphosphate, and 4 to 17 parts by weight of organophosphate ester.

Embodiment 10

The composition of embodiment 9, wherein the first hydrogenated triblock copolymer, or the second hydrogenated triblock copolymer, or both the first and second hydrogenated triblock copolymers, have a pre-hydrogenation vinyl content of 60 to 80 mole percent, based on moles of incorporated polybutadiene.

Embodiment 11

An injection molded article, comprising a composition comprising: 15 to 30 parts by weight of a poly(phenylene ether) having an intrinsic viscosity of 0.2 to 0.6 deciliter per gram, measured at 25° C. in chloroform; 15 to 30 parts by weight of a hydrogenated triblock copolymer of styrene and butadiene, wherein the hydrogenated block copolymer comprises, based on the weight of the hydrogenated block copolymer, 30 to 50 weight percent of a first hydrogenated triblock copolymer having a polystyrene content of 30 to 50 weight percent, based on the weight of the first hydrogenated triblock copolymer, and 50 to 70 weight percent of a second hydrogenated triblock copolymer having a polystyrene content of 10 to less than 30 weight percent, based on the weight of the second hydrogenated triblock copolymer, and a melt flow rate of 10 to 40 grams per 10 minutes measured at 230° C. and 2.16 kilogram load according to ASTM D1238-13; provided that the first hydrogenated triblock copolymer, or the second hydrogenated triblock copolymer, or both the first and second hydrogenated triblock copolymers, have a pre-hydrogenation vinyl content of 50 to 100 mole percent, based on moles of incorporated polybutadiene; 30 to 50 parts by weight of polyolefin comprising 5 to 15 parts by weight of polypropylene, 4 to less than 11 parts by weight of polybutene, and 10 to 30 parts by weight of an ethylene/1-octene copolymer; and 14 to 26 parts by weight of flame retardant, comprising 0 to less than 15 parts by weight of organophosphate esters that are liquid at 23° C. and 0.1 megapascal; wherein parts by weight are based on 100 parts by weight total of poly(phenylene ether), hydrogenated block copolymer, polyolefin, and flame retardant.

Embodiment 12

The injection molded article of embodiment 11, wherein the article is a cable connector or a part of a cable connector.

Embodiment 13

The injection molded article of embodiment 11 or 12, wherein the first hydrogenated triblock copolymer, or the second hydrogenated triblock copolymer, or both the first and second hydrogenated triblock copolymers, have a pre-hydrogenation vinyl content of 60 to 80 mole percent, based on moles of incorporated polybutadiene.

Embodiment 14

The injection molded article of embodiment 11 or 12, wherein the poly(phenylene ether) comprises a poly(2,6-dimethyl-1,4-phenylene ether) having an intrinsic viscosity of 0.2 to 0.4 deciliter per gram; wherein the first hydrogenated triblock copolymer comprises a polystyrene-poly(ethylene-butylene-styrene)-polystyrene tapered triblock copolymer exhibiting a melt flow rate of 4 to 16 grams per 10 minutes measured at 260° C. and 5 kilogram load according to ASTM D1238-13; wherein the second hydrogenated triblock copolymer comprises a polystyrene-poly(ethylene-butylene)-polystyrene triblock copolymer exhibiting a melt flow rate of 10 to 30 grams per 10 minutes measured at 230° C. and 2.16 kilogram load according to ASTM D1238-13; wherein the flame retardant comprises metal dialkylphosphinate, melamine polyphosphate, and organophosphate ester; and wherein the composition comprises 17 to 27 parts by weight of the poly(phenylene ether), 16 to 26 parts by weight of the hydrogenated block copolymer, comprising 30 to 45 weight percent of the first hydrogenated triblock copolymer, and 55 to 70 weight percent of the second hydrogenated triblock copolymer; 32 to 48 parts by weight of the polyolefin comprising 6 to 13 parts by weight of polypropylene, 4 to 10 parts by weight of polybutene, and 15 to 25 parts by weight of an ethylene/1-octene copolymer; and 15 to 25 parts by weight of the flame retardant, comprising 1 to 6 parts by weight of metal dialkylphosphinate, 2 to 8 parts by weight of melamine polyphosphate, and 4 to 17 parts by weight of organophosphate ester.

Embodiment 15

The injection molded article of embodiment 14, wherein the first hydrogenated triblock copolymer, or the second hydrogenated triblock copolymer, or both the first and second hydrogenated triblock copolymers, have a pre-hydrogenation vinyl content of 60 to 80 mole percent, based on moles of incorporated polybutadiene.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Examples 1 and 2, Comparative Examples 1 and 2

Components used to form the compositions are summarized in Table 1.

TABLE 1

| Component | Description |
|---|---|
| PPE | Poly(2,6-dimethyl-1,4-phenylene ether), CAS Reg. No. 25134-01-4, having an intrinsic viscosity of about 0.3 deciliter per gram as measured in chloroform at 25° C.; obtained as PPO ™ 630 Resin from SABIC Innovative Plastics. |
| S(EBS)S | Polystyrene-poly(ethylene-butylene-styrene)-polystyrene tapered triblock copolymer, having a polystyrene content of 37 to 44 weight percent, a pre-hydrogenation vinyl content of 37 mole percent based on moles of incorporated polybutadiene and as determined by $^1$H NMR, and a melt flow index of 7 grams per 10 minutes, measured at 260° C. and 5 kilogram load according to ASTM D1238; obtained as KRATON ™ A1536 HU Resin from Kraton Performance Polymers. |
| S(EB)S 1 | Polystyrene-poly(ethylene-butylene)-polystyrene triblock copolymer, CAS Reg. No. 66070-58-4, having a polystyrene content of 12.3 to 14.3 weight percent, a pre-hydrogenation vinyl content of 45 mole percent based on moles of incorporated polybutadiene and as determined by $^1$H NMR, and a melt flow index of about 22 grams per 10 minutes, measured at 230° C. and 5 kilogram load according to ASTM D1238; obtained as KRATON ™ G1657 Resin from Kraton Performance Polymers. |
| S(EB)S 2 | Polystyrene-poly(ethylene-butylene)-polystyrene triblock copolymer, CAS Reg. No. 66070-58-4, having a polystyrene content of 16.6 to 20.6 weight percent, a pre-hydrogenation vinyl content of 75 mole percent based on moles of incorporated polybutadiene and as determined by $^1$H NMR, and a melt flow index of about 19 grams per 10 minutes, measured at 230° C. and 2.16 kilogram load according to ASTM D1238; obtained as KRATON ™ G1643 Resin from Kraton Performance Polymers. |
| S(EB)S 3 | Polystyrene-poly(ethylene-butylene)-polystyrene triblock copolymer, CAS Reg. No. 66070-58-4, having a polystyrene content of 32.3 to 33.7 weight percent, a pre-hydrogenation vinyl content of 67 mole percent based on moles of incorporated polybutadiene and as determined by $^1$H NMR, and negligible melt flow index measured for 10 minutes, at 230° C. and 5 kilogram load according to ASTM D1238; obtained as KRATON ™ G1641 Resin from Kraton Performance Polymers. |
| Polypropylene | Propylene homopolymer, CAS Reg. No. 9003-07-0, having a melt flow index of 8 grams per 10 minutes, measured at 230° C. and 2.16 kilogram load according to ASTM D1238; obtained as PP 570P Resin from SABIC. |
| Polybutene | Polybutene, CAS Reg. No. 9003-29-6, having a kinematic viscosity of 100-125 centistokes at 100° C.; obtained as INDOPOL ™ H-50 from INEOS. |
| POE | Poly(ethylene-co-1-octene), CAS Reg. No. 26221-73-8, having a melt flow of 30 grams per 10 minutes, measured at 190° C. and 2.16 kilogram load according to ASTM D1238; obtained as ENGAGE ™ 8401 from Dow. |
| $Mg(OH)_2$ | Magnesium dihydroxide, CAS Reg. No. 1309-42-8, surface treated with stearic acid; obtained as KISUMA ™ 5A from Kyowa Chemical. |
| $Al(OP(O)Et_2)_3$ | Aluminum tris(diethylphosphinate), CAS Reg. No. 225789-38-8; obtained as EXOLIT ™ OP1230 from Clariant. |
| MPP | Melamine polyphosphate, CAS Reg. No. 218768-84-4, obtained as JLS-PNA from JLS Chemical. |
| BPADP | Bisphenol A bis(diphenyl phosphate), CAS Reg. No. 5945-33-5; obtained as CR-741 from Daihachi Chemical. |
| AO | Octadecyl-3-(3,5-di-tert-butyl-4-hydroxyphenyl) propionate, CAS Reg. No. 2082-79-3; obtained as IRGANOX ™ 1076 from BASF. |
| Erucamide | Erucamide, CAS Reg. No. 112-84-5; obtained as KEMAMIDE ™ E Ultra from Crompton Corp. |
| CER | 3,4-Epoxycyclohexylmethyl 3,4-epoxycyclohexanecarboxylate, CAS Reg. No. 2386-87-0; obtained as CELLOXIDE ™ 2021P from Daicel Corp. |
| Benzotriazole UVA | 2-(2H-benzotriazol-2-yl)-4,6-bis(1-methyl-1-phenylethyl)phenol, CAS Reg. No. 70321-86-7; obtained as TINUVIN ™ 234 from BASF. |
| Triazine UVA | 2-(4,6-Bis(2,4-dimethylphenyl)-1,3,5-triazin-2-yl)-5-(octyloxy)phenol, CAS Reg. No. 2725-22-6; obtained as CHIGUARD ™ 1064 from Chitec. |

TABLE 1-continued

| Component | Description |
|---|---|
| P(EO-PO) 1 | Poly(ethylene oxide-propylene oxide), having a number average molecular weight of about 11,400 grams/mole, and an ethylene oxide to propylene oxide weight ratio of 4:1; obtained as PLURONIC ™ F88 from BASF. |
| P(EO-PO) 2 | Poly(ethylene oxide-propylene oxide) monobutyl ether, having a number average molecular weight of 1,600 and an ethylene oxide to propylene oxide weight ratio of 1:1; obtained as POLYGLYKOL ™ B11/70 from Clariant. |
| PPO | Poly(propylene oxide) monobutyl ether, having a number average molecular weight of 1,100; obtained as POLYGLYKOL ™ B01/40 from Clariant. |
| PEO | Propylene oxide-initiated poly(ethylene oxide), having a number average molecular weight of about 600 grams/mole; obtained as POLYGLYKOL ™ PR 600 from Clariant. |
| Carbon black | Carbon black, CAS Reg. No. 1333-86-4; obtained as MONARCH ™ 800 from Cabot. |
| TiO$_2$ | Titanium dioxide, CAS Reg. No. 13463-67-7; obtained as TIOXIDE ™ R-TC30 from Huntsman. |
| Pigment Red 101 | Pigment Red 101, CAS Reg. No. 1309-37-1; obtained as BAYFERROX ™ 180M Pigment from Bayer. |
| Pigment Blue 29 | Pigment Blue 29, CAS Reg. No. 57455-37-5; obtained as Ultramarine 5085 from Holliday Pigments, a division of Huntsman. |
| Fragrance | Polyethylene-encapsulated fragrance; obtained as POLYIFF ™ 7191-PBD from International Flavors and Fragrances Inc. |

S(EBS)S and S(EB)S 3 are species of first hydrogenated triblock copolymer. S(EB)S 1 and S(EB)S 2 are species of second hydrogenated triblock copolymer.

Compositions are summarized in Table 2, where component amounts are expressed in parts by weight, based on 100 parts by weight total of poly(phenylene ether), hydrogenated block copolymer (S(EBS)S, S(EB)S 1, and S(EB)S 2), polyolefin (Polypropylene, Polybutene, and POE), and flame retardant (Al(OP(O)Et$_2$)$_3$, MPP, and BPADP).

Compositions were formed by melt mixing in a twin-screw extruder operating at zone temperatures from feed throat to die of 50° C., 180° C., 225° C., 245° C., 245° C., 245° C., 245° C., 245° C., 245° C., 245° C., 245° C., and 255° C. The extruder throughput was about 30 kilograms per hour. All components except BPADP were added at the feed throat. BPADP was added downstream via a liquid feeder. The extrudate was cooled and pelletized.

Prior to use for injection molding, pellets were dried for 4 hours at 80° C. Molded parts for property testing were injection molded using zone temperatures from feed throat to die of 80 to 250° C. in zones 1-3, a nozzle temperature of 245° C., a mold temperature of 40° C., a screw rotation rate of 100 rotations per minute, a back pressure of 90 kilogram force per centimeter$^2$, a holding time of 10 seconds, a cooling time of 30 seconds, an injection speed of 100 millimeters/second, and a holding pressure of 600 kilogram force per centimeter$^2$. Injection molded color chips had dimensions of 90 millimeters by 50 millimeters by 3.2 millimeters.

Melt flow rate was determined according to ASTM D1238-13 at 210° C. and 5 kilogram load. Flexural modulus values, expressed in units of megapascals, were determined according to ASTM D790-15e1 at 23° C. using bar cross-sectional dimensions of 6.4 by 12.7 millimeters, and a test speed of 12.5 millimeters/minute. Shore A hardness values, which are unitless, were determined according to ASTM D2240-15 at 23° C. and a sample thickness of 6.4 millimeters. Tensile stress at break values, expressed in units of megapascals, and tensile elongation at break values, expressed in units of percent, were determined according to ASTM D638-14 at 23° C. using a Type I bar, a gage length of 50 millimeters, and a test speed of 50 millimeters/minute.

CIELAB color parameters L*, a*, and b* were determined according to ASTM D2244-15a using a D65 standard illuminant. Ultraviolet aging was conducted according to ASTM D4459-12 using a radiant exposure of 36.5 watts/meter$^2$ at 300-400 nanometers, and an exposure time of 300 hours. ΔL*, Δa*, and Δb* were calculated by subtracting the L*, a*, and b* values before UV exposure from the corresponding values after UV exposure. Delta E*$_{ab}$, which is a measure of color change, was calculated according to ASTM D2244-15a using the equation, $$\text{Delta } E^*_{ab} = [(\Delta L^*)^2 + (\Delta a^*)^2 + (\Delta b^*)^2]^{1/2}.$$

Flame retardancy of injection molded flame bars was determined according to Underwriter's Laboratory Bulletin 94 "Tests for Flammability of Plastic Materials, UL 94", 20 mm Vertical Burning Flame Test. Before testing, flame bars with a thickness of 6 millimeters were conditioned at 23° C. and 50% relative humidity for at least 48 hours. In the UL 94 20 mm Vertical Burning Flame Test, a set of five flame bars was tested. For each bar, a flame was applied to the bar then removed, and the time required for the bar to self-extinguish (first afterflame time, t1) was noted. The flame was then reapplied and removed, and the time required for the bar to self-extinguish (second afterflame time, t2) and the post-flame glowing time (afterglow time, t3) were noted. To achieve a rating of V-0, the afterflame times t1 and t2 for each individual specimen must have been less than or equal to 10 seconds; and the total afterflame time for all five specimens (t1 plus t2 for all five specimens) must have been less than or equal to 50 seconds; and the second afterflame time plus the afterglow time for each individual specimen (t2+t3) must have been less than or equal to 30 seconds; and no specimen can have flamed or glowed up to the holding clamp; and the cotton indicator cannot have been ignited by flaming particles or drops. To achieve a rating of V-1, the afterflame times t1 and t2 for each individual specimen must have been less than or equal to 30 seconds; and the total afterflame time for all five specimens (t1 plus t2 for all five specimens) must have been less than or equal to 250 seconds; and the second afterflame time plus the afterglow time for each individual specimen (t2+t3) must have been less than or equal to 60 seconds; and no specimen can have flamed or glowed up to the holding clamp; and the cotton indicator cannot have been ignited by flaming particles or drops. To achieve a rating of V-2, the afterflame times t1 and t2 for each individual specimen must have been less than or equal to 30 seconds; and the total afterflame time for all five specimens (t1 plus t2 for all five specimens) must have been less than or equal to 250 seconds; and the second afterflame time plus the afterglow time for each individual specimen (t2+t3) must have been less than or equal to 60 seconds; and no specimen can have flamed or glowed up to the holding clamp; but the cotton indicator can have been ignited by flaming particles or drops. Compositions not achieving a rating of V-2 were considered to have failed.

Chemical resistance was measured by determining the percent retention of tensile stress and elongation at break after five days at 23° C. in three fluids: (1) a commercial sunscreen lotion obtained as Sport Performance Lotion Sunscreen SPF 30 from Banana Boat™; (2) artificial sebum, obtained from Scientific Services S/D Inc.; and (3) oleic acid (CAS Reg. No. 112-80-1).

Test results are summarized in Table 2. The effect of hydrogenated block copolymer pre-hydrogenation vinyl content is illustrated by Comparative Example 1, in which both hydrogenated block copolymers have a pre-hydrogenation vinyl content of less than 50 mole percent, and Example 1, in which S(EB)S 2 has a pre-hydrogenation vinyl content of at least 50 mole percent. Relative to Comparative Example 1, Example 1 exhibits improved chemical resistance and melt flow. The combined effects of pre-hydrogenation vinyl content and poly(alkylene oxide) are illustrated by Comparative Example 2, which lacks poly(alkylene oxide) and has S(EB)S 1 with a pre-hydrogenation vinyl content of less than 50 mole percent, and Example 2, containing 2 parts by weight poly(alkylene oxide) and S(EB)S 2 with a pre-hydrogenation vinyl content of at least 50 mole percent. Relative to Comparative Example 2, Example 2 exhibits improved melt flow.

TABLE 2

| | C. Ex. 1 | Ex. 1 | C. Ex. 2 | Ex. 2 |
|---|---|---|---|---|
| COMPOSITIONS | | | | |
| PPE | 22 | 22 | 22 | 22 |
| S(EBS)S | 8 | 8 | 8 | 8 |
| S(EB)S 1 | 13 | 0 | 13 | 0 |
| S(EB)S 2 | 0 | 13 | 0 | 13 |
| Polypropylene | 9 | 9 | 9 | 9 |
| Polybutene | 8 | 8 | 8 | 8 |
| POE | 21 | 21 | 21 | 21 |
| Al(OP(O)Et$_2$)$_3$ | 3 | 3 | 3 | 3 |
| MPP | 5 | 5 | 5 | 5 |
| BPADP | 11 | 11 | 11 | 11 |
| AO | 0.7 | 0.7 | 0.7 | 0.7 |
| Erucamide | 0.2 | 0.2 | 0.2 | 0.2 |
| CER | 0.3 | 0.3 | 0.3 | 0.3 |
| Benzotriazole UVA | 0 | 0 | 0 | 0 |
| Triazine UVA | 1 | 1 | 0.5 | 0.5 |
| P(EO-PO) 1 | 0 | 0 | 0 | 2 |
| Carbon black | 0.00001 | 0.00001 | 0 | 0 |
| TiO$_2$ | 6.86 | 6.86 | 6.86 | 6.86 |
| Pigment Red 101 | 0.048 | 0.048 | 0.048 | 0.048 |
| Pigment Blue 29 | 0.092 | 0.092 | 0.092 | 0.092 |
| Fragrance | 0.06 | 0.06 | 0.06 | 0.06 |
| PROPERTIES | | | | |
| MFR (g/10 min) | 29.9 | 36.4 | 28.6 | 38.5 |
| Flex. mod. (MPa) | 98.1 | 99.7 | 93.0 | 70.7 |
| Shore A | 84.9 | 87.4 | 85.0 | 82.7 |
| Tens. stress (MPa) | 9.3 | 10.1 | 8.3 | 5.8 |
| Tens. elong. (%) | 157.3 | 139.0 | 112.0 | 122.7 |
| L*, before UV | 86.0 | 86.0 | 86.3 | 85.8 |
| a*, before UV | −1.5 | −1.5 | −1.7 | −1.7 |
| b*, before UV | −1.4 | −1.6 | −1.3 | −1.3 |
| L*, after UV | 86.6 | 86.6 | 87.0 | 86.5 |
| a*, after UV | −2.0 | −2.1 | −2.4 | −2.6 |
| b*, after UV | −0.8 | −0.3 | −0.2 | 0.9 |
| ΔL*, UV | 0.6 | 0.6 | 0.7 | 0.7 |
| Δa*, UV | −0.5 | −0.6 | −0.7 | −0.9 |
| Δb*, UV | 0.6 | 1.3 | 1.1 | 2.2 |
| ΔE*$_{ab}$, UV | 0.9 | 1.6 | 1.5 | 2.5 |
| UL 94 | V-0 | V-0 | V-0 | V-0 |
| TS retention, banana boat (%) | 84 | 84 | — | — |
| TE retention, banana boat (%) | 58 | 77 | — | — |
| TS retention, sebum (%) | 84 | 91 | — | — |
| TE retention, sebum (%) | 64 | 80 | — | — |
| TS retention, oleic acid (%) | 85 | 98 | — | — |
| TE retention, oleic acid (%) | 62 | 81 | — | — |

Examples 3-7, Comparative Examples 3 and 4

These examples illustrate the effects of poly(alkylene oxide) identity, liquid polybutene content, and liquid flame retardant content.

The surface stickiness test was performed with the injection molded color chips described above. After molding, the chips were held at 23° C. and 50 percent humidity for 24 hours. To assess stickiness, the surface of a chip was touched with a finger and the surface was characterized as sticky ("yes" in Table 3) or not sticky ("no" in Table 3).

Compositions and results are summarized in Table 3, where component amounts are expressed in parts by weight, based on 100 parts by weight total of poly(phenylene ether), hydrogenated block copolymer (S(EBS)S, and S(EB)S 2), polyolefin (Polypropylene, Polybutene, and POE), and flame retardant (Mg(OH)$_2$, MPP, and BPADP). Relative to Example 3 with no poly(alkylene oxide), Examples 4-7, each with a different poly(alkylene oxide), exhibit improved melt flow. Unlike Example 3, Comparative Example 4, with decreased S(EB)S 2 content and increased polybutene content, and Comparative Example 5, with decreased S(EB)S 2 content and increased liquid flame retardant content, exhibit sticky surfaces.

TABLE 3

|  | Ex. 3 | Ex. 4 | Ex. 5 | Ex. 6 | Ex. 7 | C. Ex. 3 | C. Ex. 4 |
|---|---|---|---|---|---|---|---|
| COMPOSITIONS | | | | | | | |
| PPE | 24 | 24 | 24 | 24 | 24 | 24 | 24 |
| S(EBS)S | 8 | 8 | 8 | 8 | 8 | 8 | 8 |
| S(EB)S 2 | 13 | 13 | 13 | 13 | 13 | 8 | 9 |
| Polypropylene | 8 | 8 | 8 | 8 | 8 | 8 | 8 |
| Polybutene | 6 | 6 | 6 | 6 | 6 | 11 | 6 |
| POE | 20 | 20 | 20 | 20 | 20 | 20 | 20 |
| Mg(OH)$_2$ | 5 | 5 | 5 | 5 | 5 | 5 | 5 |
| MPP | 5 | 5 | 5 | 5 | 5 | 5 | 5 |
| BPADP | 11 | 11 | 11 | 11 | 11 | 11 | 15 |
| AO | 0.7 | 0.7 | 0.7 | 0.7 | 0.7 | 0.7 | 0.7 |
| Erucamide | 0.2 | 0.2 | 0.2 | 0.2 | 0.2 | 0.2 | 0.2 |
| CER | 0.3 | 0.3 | 0.3 | 0.3 | 0.3 | 0.3 | 0.3 |
| Benzotriazole UVA | 1 | 1 | 1 | 1 | 1 | 1 | 1 |
| P(EO-PO) 1 | 0 | 2 | 0 | 0 | 0 | 0 | 0 |
| P(EO-PO) 2 | 0 | 0 | 0 | 2 | 0 | 0 | 0 |
| PPO | 0 | 0 | 2 | 0 | 0 | 0 | 0 |
| PEO | 0 | 0 | 0 | 0 | 2 | 0 | 0 |
| TiO$_2$ | 6.86 | 6.86 | 6.86 | 6.86 | 6.86 | 6.86 | 6.86 |
| Pigment Red 101 | 0.048 | 0.048 | 0.048 | 0.048 | 0.048 | 0.048 | 0.048 |
| Pigment Blue 29 | 0.092 | 0.092 | 0.092 | 0.092 | 0.092 | 0.092 | 0.092 |
| Fragrance | 0.06 | 0.06 | 0.06 | 0.06 | 0.06 | 0.06 | 0.06 |
| PROPERTIES | | | | | | | |
| MFR (g/10 min) | 31.3 | 33.0 | 40.8 | 38.7 | 40.2 | 53.7 | 48.5 |
| Flex. mod. (MPa) | 184 | 112 | 174 | 225 | 195 | 119 | 348 |
| Shore A | 88.7 | 86.9 | 88.4 | 89.4 | 88.6 | 86.4 | 91.2 |
| Tens. stress (MPa) | 12.9 | 9.3 | 12.7 | 13.2 | 11.9 | 9.1 | 12.5 |
| Tens. elong. (%) | 111.2 | 105.4 | 143.6 | 128.8 | 111.6 | 70.9 | 87.5 |
| L*, before UV | 86.9 | 87.1 | 87.2 | 87.3 | 87.3 | 87.1 | 87.2 |
| a*, before UV | −1.7 | −1.7 | −1.7 | −1.7 | −1.8 | −1.9 | −1.6 |
| b*, before UV | −1.7 | −2.1 | −2.0 | −2.2 | −2.2 | −2.2 | −3.2 |
| L*, after UV | 87.4 | 87.5 | 87.8 | 87.8 | 87.8 | 87.4 | 87.4 |
| a*, after UV | −1.8 | −2.1 | −1.4 | −1.4 | −1.6 | −2.1 | −1.6 |
| b*, after UV | −1.9 | −1.3 | −3.1 | −3.3 | −2.8 | −1.3 | −3.0 |
| ΔL*, UV | 0.5 | 0.4 | 0.6 | 0.5 | 0.5 | 0.3 | 0.2 |
| Δa*, UV | −0.1 | −0.4 | 0.3 | 0.3 | 0.2 | −0.2 | 0.0 |
| Δb*, UV | −0.2 | 0.8 | −1.1 | −1.1 | −0.6 | 0.9 | 0.2 |
| ΔE*$_{ab}$, UV | 0.55 | 0.98 | 1.29 | 1.24 | 0.81 | 0.97 | 0.28 |
| UL 94 | V-0 | V-0 | V-0 | V-0 | V-0 | V-0 | V-0 |
| Surface sticky? | no | no | no | no | no | yes | yes |

Example 8-14, Comparative Examples 5-8

These prophetic examples illustrate additional inventive and comparative compositions. Compositions are summarized in Table 4, where component amounts are expressed in parts by weight, based on 100 parts by weight total of poly(phenylene ether), hydrogenated block copolymer (S(EBS)S, S(EB)S 1, S(EB)S 2, and S(EB)S 3), polyolefin (Polypropylene, Polybutene, and POE), and flame retardant (Mg(OH)$_2$, Al(OP(O)Et$_2$)$_3$, MPP, and BPADP).

TABLE 4

|  | C. Ex. 5 | Ex. 8 | C. Ex. 6 | Ex. 8 | Ex. 9 | Ex. 10 |
|---|---|---|---|---|---|---|
| COMPOSITIONS | | | | | | |
| PPE | 22 | 22 | 25 | 22 | 22 | 22 |
| S(EBS)S | 8 | 8 | 10 | 0 | 0 | 0 |
| S(EB)S 3 | 0 | 0 | 0 | 8 | 8 | 8 |
| S(EB)S 1 | 13 | 0 | 0 | 13 | 0 | 0 |
| S(EB)S 2 | 0 | 13 | 13 | 0 | 13 | 13 |
| Polypropylene | 9 | 9 | 0 | 9 | 9 | 14 |
| POE | 21 | 21 | 25 | 21 | 21 | 16 |
| Polybutene | 8 | 8 | 8 | 8 | 8 | 8 |
| Mg(OH)$_2$ | 0 | 0 | 0 | 0 | 0 | 0 |
| Al(OP(O)Et$_2$)$_3$ | 3 | 3 | 3 | 3 | 3 | 3 |
| MPP | 5 | 5 | 5 | 5 | 5 | 5 |
| BPADP | 11 | 11 | 11 | 11 | 11 | 11 |

TABLE 4-continued

| AO | 0.7 | 0.7 | 0.7 | 0.7 | 0.7 | 0.7 |
|---|---|---|---|---|---|---|
| Erucamide | 0.2 | 0.2 | 0.2 | 0.2 | 0.2 | 0.2 |
| TiO$_2$ | 6.86 | 6.86 | 6.86 | 6.86 | 6.86 | 6.86 |
| Pigment Red 101 | 0.048 | 0.048 | 0.048 | 0.048 | 0.048 | 0.048 |
| Pigment Blue 29 | 0.092 | 0.092 | 0.092 | 0.092 | 0.092 | 0.092 |
| CER | 0.3 | 0.3 | 0.3 | 0.3 | 0.3 | 0.3 |
| Triazine UVA | 1 | 1 | 1 | 1 | 1 | 1 |
| PPO | 0 | 0 | 0 | 0 | 0 | 0 |
| Fragrance | 0.06 | 0.06 | 0.06 | 0.06 | 0.06 | 0.06 |

|  | Ex. 11 | C. Ex. 7 | Ex. 12 | Ex. 13 | Ex. 14 | C. Ex. 8 |
|---|---|---|---|---|---|---|
| COMPOSITIONS | | | | | | |
| PPE | 22 | 24 | 24 | 24 | 24 | 30 |
| S(EBS)S | 0 | 9 | 9 | 0 | 9 | 9 |
| S(EB)S 3 | 8 | 0 | 0 | 9 | 0 | 0 |
| S(EB)S 1 | 0 | 16 | 8 | 8 | 4 | 0 |
| S(EB)S 2 | 13 | 0 | 8 | 8 | 8 | 16 |
| Polypropylene | 9 | 12 | 12 | 12 | 16 | 6 |
| POE | 21 | 12 | 12 | 12 | 12 | 12 |
| Polybutene | 8 | 6 | 6 | 6 | 6 | 6 |
| Mg(OH)$_2$ | 0 | 4.5 | 4.5 | 4.5 | 4.5 | 4.5 |
| Al(OP(O)Et$_2$)$_3$ | 3 | 0 | 0 | 0 | 0 | 0 |
| MPP | 5 | 5.5 | 5.5 | 5.5 | 5.5 | 5.5 |
| BPADP | 11 | 11 | 11 | 11 | 11 | 11 |
| AO | 0.7 | 0.7 | 0.7 | 0.7 | 0.7 | 0.7 |

TABLE 4-continued

| | | | | | | |
|---|---|---|---|---|---|---|
| Erucamide | 0.2 | 0.2 | 0.2 | 0.2 | 0.2 | 0.2 |
| TiO$_2$ | 6.86 | 0 | 0 | 0 | 0 | 0 |
| Pigment Red 101 | 0.048 | 0 | 0 | 0 | 0 | 0 |
| Pigment Blue 29 | 0.092 | 0 | 0 | 0 | 0 | 0 |
| CER | 0.3 | 0 | 0 | 0 | 0 | 0 |
| Triazine UVA | 1 | 0 | 0 | 0 | 0 | 0 |
| PPO | 2 | 0 | 0 | 0 | 0 | 0 |
| Fragrance | 0.06 | 0.06 | 0.06 | 0.06 | 0.06 | 0.06 |

The invention claimed is:

1. A composition, comprising:
   15 to 30 parts by weight of a poly(phenylene ether) having an intrinsic viscosity of 0.2 to 0.6 deciliter per gram, measured at 25° C. in chloroform;
   15 to 30 parts by weight of a hydrogenated triblock copolymer of styrene and butadiene, wherein the hydrogenated block copolymer comprises, based on the weight of the hydrogenated block copolymer,
      30 to 50 weight percent of a first hydrogenated triblock copolymer having a polystyrene content of 30 to 50 weight percent, based on the weight of the first hydrogenated triblock copolymer, and
      50 to 70 weight percent of a second hydrogenated triblock copolymer having a polystyrene content of 10 to less than 30 weight percent, based on the weight of the second hydrogenated triblock copolymer, and a melt flow rate of 10 to 40 grams per 10 minutes measured at 230° C. and 2.16 kilogram load according to ASTM D1238-13;
   provided that the first hydrogenated triblock copolymer, or the second hydrogenated triblock copolymer, or both the first and second hydrogenated triblock copolymers, have a pre-hydrogenation vinyl content of 50 to 100 mole percent, based on moles of incorporated polybutadiene;
      30 to 50 parts by weight of polyolefin comprising
         5 to 15 parts by weight of polypropylene,
         4 to less than 11 parts by weight of polybutene, and
         10 to 30 parts by weight of an ethylene/1-octene copolymer; and
      14 to 26 parts by weight of flame retardant, comprising 0 to less than 15 parts by weight of organophosphate esters that are liquid at 23° C. and 0.1 megapascal;
   wherein parts by weight are based on 100 parts by weight total of poly(phenylene ether), hydrogenated block copolymer, polyolefin, and flame retardant.

2. The composition of claim 1, wherein the first hydrogenated triblock copolymer comprises a polystyrene-poly(ethylene-butylene-styrene)-polystyrene tapered triblock copolymer having a polystyrene content of 35 to 50 weight percent and exhibiting a melt flow rate of 4 to 16 grams per 10 minutes measured at 260° C. and 5 kilogram load according to ASTM D1238-13.

3. The composition of claim 1, wherein the second hydrogenated triblock copolymer comprises a polystyrene-poly(ethylene-butylene)-polystyrene triblock copolymer having a polystyrene content of 10 to 25 weight percent and exhibiting a melt flow rate of 10 to 30 grams per 10 minutes measured at 230° C. and 2.16 kilogram load according to ASTM D1238-13.

4. The composition of claim 1, wherein the flame retardant comprises metal dialkylphosphinate, melamine polyphosphate, and organophosphate ester.

5. The composition of claim 1, wherein the flame retardant comprises
   1 to 6 parts by weight of metal dialkylphosphinate,
   2 to 8 parts by weight of melamine polyphosphate, and
   4 to 17 parts by weight of organophosphate ester.

6. The composition of claim 1, further comprising 0.5 to 10 parts by weight of a poly(alkylene oxide).

7. The composition of claim 6, wherein the poly(alkylene oxide) is selected from the group consisting of poly(ethylene oxide)s, poly(propylene oxide)s, random copolymers of ethylene oxide and propylene oxide, block copolymers of ethylene oxide and propylene oxide, monoalkyl ethers of the foregoing, dialkyl ethers of the foregoing, and combinations thereof.

8. The composition of claim 1, wherein the first hydrogenated triblock copolymer, or the second hydrogenated triblock copolymer, or both the first and second hydrogenated triblock copolymers, have a pre-hydrogenation vinyl content of 60 to 80 mole percent, based on moles of incorporated polybutadiene.

9. The composition of claim 1,
   wherein the poly(phenylene ether) comprises a poly(2,6-dimethyl-1,4-phenylene ether) having an intrinsic viscosity of 0.2 to 0.4 deciliter per gram;
   wherein the first hydrogenated triblock copolymer comprises a polystyrene-poly(ethylene-butylene-styrene)-polystyrene tapered triblock copolymer exhibiting a melt flow rate of 4 to 16 grams per 10 minutes measured at 260° C. and 5 kilogram load according to ASTM D1238-13;
   wherein the second hydrogenated triblock copolymer comprises a polystyrene-poly(ethylene-butylene)-polystyrene triblock copolymer exhibiting a melt flow rate of 10 to 30 grams per 10 minutes measured at 230° C. and 2.16 kilogram load according to ASTM D1238-13;
   wherein the flame retardant comprises metal dialkylphosphinate, melamine polyphosphate, and organophosphate ester; and
   wherein the composition comprises
      17 to 27 parts by weight of the poly(phenylene ether),
      16 to 26 parts by weight of the hydrogenated block copolymer, comprising
         30 to 45 weight percent of the first hydrogenated triblock copolymer, and
         55 to 70 weight percent of the second hydrogenated triblock copolymer;
      32 to 48 parts by weight of the polyolefin comprising
         6 to 13 parts by weight of polypropylene,
         4 to 10 parts by weight of polybutene, and
         15 to 25 parts by weight of an ethylene/1-octene copolymer; and
      15 to 25 parts by weight of the flame retardant, comprising
         1 to 6 parts by weight of metal dialkylphosphinate,
         2 to 8 parts by weight of melamine polyphosphate, and
         4 to 17 parts by weight of organophosphate ester.

10. The composition of claim 9, wherein the first hydrogenated triblock copolymer, or the second hydrogenated triblock copolymer, or both the first and second hydrogenated triblock copolymers, have a pre-hydrogenation vinyl content of 60 to 80 mole percent, based on moles of incorporated polybutadiene.

11. An injection molded article, comprising a composition comprising:
- 15 to 30 parts by weight of a poly(phenylene ether) having an intrinsic viscosity of 0.2 to 0.6 deciliter per gram, measured at 25° C. in chloroform;
- 15 to 30 parts by weight of a hydrogenated triblock copolymer of styrene and butadiene, wherein the hydrogenated block copolymer comprises, based on the weight of the hydrogenated block copolymer,
  - 30 to 50 weight percent of a first hydrogenated triblock copolymer having a polystyrene content of 30 to 50 weight percent, based on the weight of the first hydrogenated triblock copolymer, and
  - 50 to 70 weight percent of a second hydrogenated triblock copolymer having a polystyrene content of 10 to less than 30 weight percent, based on the weight of the second hydrogenated triblock copolymer, and a melt flow rate of 10 to 40 grams per 10 minutes measured at 230° C. and 2.16 kilogram load according to ASTM D1238-13;

provided that the first hydrogenated triblock copolymer, or the second hydrogenated triblock copolymer, or both the first and second hydrogenated triblock copolymers, have a pre-hydrogenation vinyl content of 50 to 100 mole percent, based on moles of incorporated polybutadiene;
- 30 to 50 parts by weight of polyolefin comprising
  - 5 to 15 parts by weight of polypropylene,
  - 4 to less than 11 parts by weight of polybutene, and
  - 10 to 30 parts by weight of an ethylene/1-octene copolymer; and
- 14 to 26 parts by weight of flame retardant, comprising 0 to less than 15 parts by weight of organophosphate esters that are liquid at 23° C. and 0.1 megapascal;

wherein parts by weight are based on 100 parts by weight total of poly(phenylene ether), hydrogenated block copolymer, polyolefin, and flame retardant.

12. The injection molded article of claim 11, wherein the article is a cable connector or a part of a cable connector.

13. The injection molded article of claim 11, wherein the first hydrogenated triblock copolymer, or the second hydrogenated triblock copolymer, or both the first and second hydrogenated triblock copolymers, have a pre-hydrogenation vinyl content of 60 to 80 mole percent, based on moles of incorporated polybutadiene.

14. The injection molded article of claim 11,
wherein the poly(phenylene ether) comprises a poly(2,6-dimethyl-1,4-phenylene ether) having an intrinsic viscosity of 0.2 to 0.4 deciliter per gram;
wherein the first hydrogenated triblock copolymer comprises a polystyrene-poly(ethylene-butylene-styrene)-polystyrene tapered triblock copolymer exhibiting a melt flow rate of 4 to 16 grams per 10 minutes measured at 260° C. and 5 kilogram load according to ASTM D1238-13;
wherein the second hydrogenated triblock copolymer comprises a polystyrene-poly(ethylene-butylene)-polystyrene triblock copolymer exhibiting a melt flow rate of 10 to 30 grams per 10 minutes measured at 230° C. and 2.16 kilogram load according to ASTM D1238-13;
wherein the flame retardant comprises metal dialkylphosphinate, melamine polyphosphate, and organophosphate ester; and
wherein the composition comprises
- 17 to 27 parts by weight of the poly(phenylene ether),
- 16 to 26 parts by weight of the hydrogenated block copolymer, comprising
  - 30 to 45 weight percent of the first hydrogenated triblock copolymer, and
  - 55 to 70 weight percent of the second hydrogenated triblock copolymer;
- 32 to 48 parts by weight of the polyolefin comprising
  - 6 to 13 parts by weight of polypropylene,
  - 4 to 10 parts by weight of polybutene, and
  - 15 to 25 parts by weight of an ethylene/1-octene copolymer; and
- 15 to 25 parts by weight of the flame retardant, comprising
  - 1 to 6 parts by weight of metal dialkylphosphinate,
  - 2 to 8 parts by weight of melamine polyphosphate, and
  - 4 to 17 parts by weight of organophosphate ester.

15. The injection molded article of claim 14, wherein the first hydrogenated triblock copolymer, or the second hydrogenated triblock copolymer, or both the first and second hydrogenated triblock copolymers, have a pre-hydrogenation vinyl content of 60 to 80 mole percent, based on moles of incorporated polybutadiene.

* * * * *